United States Patent Office 3,133,944
Patented May 19, 1964

3,133,944
METAL SALTS OF γ,γ-BIS-(PARA-HYDROXY-PHENYL)VALERIC ACID
Roger M. Christenson, Richland Township, Pa., assignor to Pittsburgh Plate Glass Company, Allegheny County, Pa., a corporation of Pennsylvania
No Drawing. Filed May 18, 1956, Ser. No. 585,603
4 Claims. (Cl. 260—434)

This invention relates to materials which are adapted to retard or prevent the growth of biological organisms and it has particular relation to materials adapted to retard or prevent growth of such micro-organisms as molds and mildews.

In a copending application, Serial No. 377,002, filed August 27, 1953, to Alfred R. Bader, it is disclosed to prepare novel phenols containing carboxyls and being of the generalized formula:

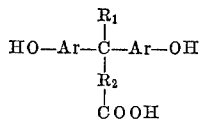

in which the groups designated as Ar are aryl groups, the group $R_1$ is an alkyl hydrocarbon group of 1 to 4 carbon atoms and the group $R_2$ is an alkylene hydrocarbon group of 2 to 6 carbon atoms, where the free valences of the alkylene group are attached to different carbon atoms thereof.

The compounds of this class are represented by gamma,-gamma-p,p'-di(hydroxyphenyl)valeric acid of the formula:

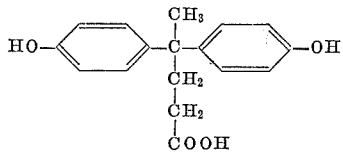

In the formula, the group Ar may be represented by groups such as:

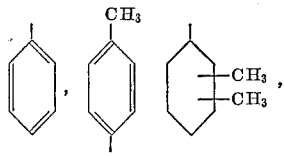

and others. $R_1$ may be a group such as:

—$CH_3CH_2CH_3$—, —$CH_2CH_2CH_3$—
—$CH_2CH_2CH_2CH_3$— and isomers thereof. The group $R_2$ may be of a class such as is represented as follows:

—$CH_2CH_2$—, —$CH_2CH_2CH_2$—
—$CH_2CH_2CH_2CH_2$—

—$CH_2CH_2CH_2CH_2CH_2$—, $CH_2CH_2CH_2CH_2CH_2CH$— and isomers thereof, e.g.

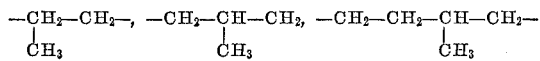

etc.

Levulinic acid is reacted with phenol in the preparation of the gamma,gamma-p,p'-di(hydroxyphenyl)valeric acid depicted structurally hereinabove. However, levulinic acid may be replaced by other keto carboxylic acids in which the keto group is more remote than the beta position. Examples comprise lactarinic acid, mesitonic acid, delta-keto-caproic acid, geronic acid and others. These may be paired with phenols such as phenol and its homologues as above given and reacted to prepare di(hydroxyphenyl)alkylidene dicarboxylic acids.

This invention is based upon the discovery that the foregoing compounds, and particularly gamma,gamma-p,p'-di-(hydroxyphenyl)valeric acid can successfully be converted into salts of heavy metals having valuable properties for various purposes, such as fungicides useful for various applications such as the protection of paints and other coating compositions from the action of fungi.

The salt of the foregoing phenol-substituted carboxylic acids may be represented by the following formula:

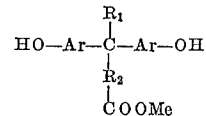

where the groups designated as Ar, $R_1$ and $R_2$ have the significance previously indicated and the group Me is a heavy metal and being represented by mercury, copper, manganese, zinc, chromium, cobalt and the like. Heavy metals are ordinarily defined as those metals whose specific gravity is greater than four. The heavy metals are all located in the lower half of the new periodic table, they have complex spectra, form colored salts and doublesalts, have a low electrode potential, are mainly amphoteric, and yield weak bases and weak acids. They have usually more than one valency forming more than one series of compounds, and therefore behaving as oxidizing or reducing agents. Particular emphasis is placed upon those compounds in which the group Me is mercury or copper.

In the preparation of the diphenolic acids suitable for conversion into salts in accordance with the provisions of the present invention, the preparation of gamma,gamma-p,p'-di(hydroxyphenyl)valeric acid will be used as an illustration. In such preparation, the techniques disclosed in an article as reported by Alfred R. Bader and Anthony D. Kontowicz, Journal of the American Chemical Society, volume 76( 1954), page 4465, may be employed. This method is as follows:

A cooled mixture of 94 g. (1 mole) of phenol, 58 g. (0.5 mole) of levulinic acid, 45 g. of water and 180 g. of concentrated sulfuric acid was stirred at 25° for 20 hours. The reaction is slightly exothermic. The mixture was diluted with water and extracted with ethyl acetate. The organic solution was in turn extracted exhaustively with aqueous sodium bicarbonate, stripped and distilled to yield 20 g. of unreacted phenol. The almost colorless bicarbonate extract was acidified, extracted with ether and the washed ether extract stripped in vacuo to yield 87 g. (0.30 mole, 77 percent yield based on unrecovered phenol) of gamma,gamma-p,p'-di(hydroxyphenyl)valeric acid, an almost colorless glass, M.P. ca. 90° C., acid value found 192, calculated 195.

A similar yield of gamma,gamma-p,p'-di(hydroxyphenyl)valeric acid is obtained with a catalyst mixture of 77 cc. of concentrated hydrochloric acid and 37 cc. of water, and a reaction temperature of 90° C.–95° C. With 85 percent phosphoric acid at 90° C.– 95° C. the yield is smaller and the product darker.

The amorphous product forms crystalline solvates with aromatic hydrocarbons. From benzene it crystallizes in flat, white needles, M.P. 120° C.–122° C.; from toluene in stout needles, M.P. 108° C.–109° C.; from m-xylene in flat needles, M.P. 96° C.–98° C. Removal of the solvent of crystallization in vacuo at 90° C. leaves a glass, M.P. ca. 90° C.

Analysis
[BENZENE SOLVATE ($C_{17}H_{18}O_4 \cdot \frac{1}{2}C_6H_6$)]

| Element | Calculated (percent) | Found (percent) |
|---|---|---|
| C | 73.82 | 73.48 |
| H | 6.51 | 6.62 |

Analysis
[TOLUENE SOLVATE ($C_{17}H_{18}O_4 \cdot \frac{1}{2}C_7H_8$)]

| Element | Calculated (percent) | Found (percent) |
|---|---|---|
| C | 74.07 | 74.44 |
| H | 6.67 | 7.02 |

A large batch was crystallized solvent-free from a mixture of toluene and acetone, M.P. 168° C.–170° C. It formed hard, white rosettes from water containing a trace of acetic acid, M.P. 170° C.–172° C., and could also be crystallized well from mixtures of heptane and ethyl acetate, or benzene and acetone. Hot solutions of the amorphous modification in aromatic hydrocarbons when seeded with solvent-free crystals, yielded the crystals, M.P. 171° C.–172° C., on cooling.

Analysis
[GAMMA,GAMMA-p,p'-DI(HYDROXYPHENYL)VALERIC ACID ($C_{17}H_{18}O_4$)]

| Element | Calculated (percent) | Found (percent) |
|---|---|---|
| C | 71.31 | 70.99–70.94 |
| H | 6.34 | 6.62– 6.46 |

INFRARED SPECTROGRAPHIC ANALYSIS IN EtOH—0.1 PERCENT HOAc

Lambda max.: $m\mu$ 225.0 (log E 4.20); 227.5 (infl., log E 4.18); 279.0 (log E 3.57); 282.5 (infl., log E 3.53) Lambda min.: $m\mu$ 250.0 (log E 2.71).

The ultraviolet spectra of the solvates are very similar. The infrared spectrum of gamma,gamma-p,p'-di(hydroxyphenyl)valeric acid in a Nujol mull shows a strong band at $12.0\mu$ (indicative of para substitution), and no band at $13.2$–$13.4\mu$.

Solvent-free, crystalline gamma,gamma-p,p'-di(hydroxyphenyl)valeric acid forms a methyl ester which crystallizes from aqueous methanol with water of crystallization and melts at 87° C.–89° C.

Analysis
[METHYL ESTER ($C_{18}H_{20}O_4 \cdot 3H_2O$)]

| Element | Calculated (percent) | Found (percent) |
|---|---|---|
| C | 61.00 | 61.43 |
| H | 7.40 | 7.60 |

The conversion of gamma,gamma-p,p'-di(hydroxyphenyl)valeric acid into a copper salt may be conducted as follows:

EXAMPLE I

A reaction mixture is prepared comprising:

Gamma,gamma-p,p'-di(hydroxyphenyl)valeric acid _____ grams__ 20
Distilled water _____ milliliters__ 400

This mixture is treated with 5 percent sodium hydroxide solution to obtain a pH value of 8 until solution is obtained. The pH value is then adjusted to 8 with acetic acid and 175 milliliters of 0.2 normal copper acetate is added. A green precipitate is formed and this is washed and rewashed in water and dried in a vacuum desiccator. The product is obtained as a dried, crystalline material.

EXAMPLE II

This example is illustrative of the preparation of the mercury salt of gamma,gamma-p,p'-di(hydroxyphenyl)-valeric acid. In accordance with the example, 20 grams of the latter compound in 400 milliliters of distilled water is dissolved by addition of sodium hydroxide as a 5 percent solution. After the gamma,gamma-p,p'-di(hydroxyphenyl)valeric acid has gone into solution, the pH value is adjusted to 8 with acetic acid. To the solution is then added 248 milliliters of 0.1 mole of mercury acetate solution. A precipitate is formed which is washed and rewashed with water and then dried in a vacuum desiccator.

The preparation of the zinc salt of gamma,gamma-p,p'-di(hydroxyphenyl)valeric acid was conducted as follows:

EXAMPLE III

A 20 gram portion of gamma,gamma-p,p'-di(hydroxyphenyl)valeric acid was placed in 400 cc. of distilled water and was dissolved by adding 95 milliliters of 5 percent sodium hydroxide. The pH value was then adjusted to 8 by adding hydrochloric acid. The solution was cooled to a temperature of about 5° C., at which point a solution of 0.2 molar zinc chloride at a similar temperature was added in an amount of 178 milliliters. The solution was added slowly to the dissolved gamma,gamma-p,p'-di(hydroxyphenyl)valeric acid solution. A precipitate was formed and was washed twice with cold water and dried in a vacuum desiccator. The dried product was crystalline and of a brownish color.

The foregoing salts have valuable properties in the killing of or retarding of the development of microorganisms such as bacteria and molds. These properties are illustrated by the following tests:

EXAMPLE IV

In accordance with this example, the effects of the copper, mercury and zinc salts of gamma,gamma-p,p'-di(hydroxyphenyl)valeric acid, as well as the free acid, was determined in retarding or preventing the growth of certain molds in a typical paint composition. The composition is one sold by the Pittsburgh Plate Glass Company under the trade name of SunProof and is a composition of linseed oil and titanium dioxide. The test samples were prepared by painting both sides of a sheet of No. 1 Whatman filter paper with the paint containing the acid or salt under test. The fungicide was employed in an amount of 2 per cent by weight based upon the paint. The samples were dried for 48 hours and were then cut into squares 1¼ inch upon a side. Marginal lines were laid out around the squares ⅛ inch from each edge. The samples were then baked in an oven at 65° for 8 hours and put into a water bath at 25° C. for 48 hours. Such water as could be removed by shaking the samples was eliminated in that manner.

The culture medium for the organisms employed in the test was of the following composition:

CULTURE MEDIUM

|  | Grams |
|---|---|
| $NH_4NO_3$ | 3.0 |
| $MgSO_4 7H_2O$ | 3.0 |
| $KH_2PO_4$ | 2.5 |
| $K_2HPO_4$ | 2.0 |
| Sucrose | 30.5 |
| Agar | 15.0 |
| Distilled $H_2O$ | 1000.0 |

In order to sterilize the culture medium, the latter was heated first to boiling and then was placed in a steam sterilizer for 30 minutes at 15 pounds pressure per square inch. The hot medium was poured into sterile Petri dishes.

In order to prepare an inoculum for the tests, a 50 milliliter water solution of the following mineral salts was made up:

INOCULUM

| | Grams |
|---|---|
| $NH_4NO_3$ | 3.0 |
| $MgSO_4 7H_2O$ | 2.0 |
| $KH_2PO_4$ | 2.5 |
| $K_2HPO_4$ | 2.0 |

This solution also contained a few drops of a nontoxic wetting agent, namely, Triton X-100 which is sold commercially by the Rohm & Haas Company of Philadelphia, Pa., and is understood to comprise a condensate of an alkyl phenol and ethylene oxide. Any other non-toxic wetting agent could be employed if so desired. This solution was added to a 6-day old fruiting culture of the organism to be tested. In this instance, the organisms were respectively penicillium citrinum and aspergillus arygae.

The spores of the organisms were dispersed in the medium by brushing the surface of the inoculum with a sterile camel's hair brush.

The samples to be tested were placed in the centers of the culture medium samples in the Petri dishes with the marginal lines upon the samples disposed uppermost. The samples and the surrounding medium were then inoculated by distribution over the surface thereof, of a 1.5 milliliter quantity of the inoculum. Three sets of samples were made up for each of the two species of mold which were employed in the test. Also samples were made up as blanks or controls, comprising medium with added inoculum but without any test sample of coated paper.

The Petri dishes containing the test specimens were then put into the incubator and incubated at a temperature of 93° F. at a relative humidity of 100 percent for a period of 8 days.

The samples were graded for inhibitory action in accordance with the following scale:

1 = no molds in growth on any portion of the sample within the guide lines; growth up to the guide lines is disregarded.
2 = slight mold growth on any portion of the sample within the guide lines.
3 = moderate mold growth on any portion of the sample within the guide lines.
4 = mold growth on any portion of the sample within the guide lines.

The results of the ratings on this scale for the salts are tabulated as follows:

FUNGICIDE RESULTS—EXPERIMENT I

| Penicillium citrinum Penicillium control=4 | | | Aspergillus arygae Aspergillus control=4 | | |
|---|---|---|---|---|---|
| Sample No. | Gamma, gamma-p, p'-di(hydroxyphenyl)-valeric acid | Rating | Sample No. | Gamma, gamma-p, p'-di(hydroxyphenyl)-valeric acid | Rating |
| 1a | Free acid | 1 | 1d | Free acid | 2 |
| 1b | do | 2 | 1e | do | 3 |
| 1c | do | 2 | 1f | do | 3 |
| 2a | Copper salt | 1 | 2d | Copper salt | 1 |
| 2b | do | 1 | 2e | do | 2 |
| 2c | do | 1 | 2f | do | 2 |
| 3a | Mercury salt | 1 | 3d | Mercury salt | 3 |
| 3b | do | 2 | 3e | do | 3 |
| 3c | do | 1 | 3f | do | 3 |
| 4a | Zinc salt | 2 | 4d | Zinc salt | 3 |
| 4b | do | 2 | 4e | do | 3 |
| 4c | do | 2 | 4f | do | 3 |

In each instance, it will be observed that there was a very pronounced inhibitory action exerted by the paint containing the salts preventing the growth of the microorganisms. The salt compounds could be employed in paints to prevent the development of molds therein.

The foregoing tests were repeated but with 2 percent by weight of a 10 percent solution of the same fungicides in the paint. The solution was incorporated with the paint before the application thereof to the paper. The results of these tests are tabulaed as follows:

FUNGICIDE RESULTS—EXPERIMENT II

| Penicillium citrinum Penicillium control=4 | | | Aspergillus arygae Aspergillus control=4 | | |
|---|---|---|---|---|---|
| Sample No. | Gamma, gamma-p, p'-di(hydroxyphenyl)-valeric acid | Rating | Sample No. | Gamma, gamma-p, p'-di(hydroxyphenyl)-valeric acid | Rating |
| 1a | Free acid | 2 | 1d | Free acid | 2 |
| 1b | do | 2 | 1e | do | 2 |
| 1c | do | 2 | 1f | do | 3 |
| 2a | Copper salt | 2 | 2d | Copper salt | 3 |
| 2b | do | 2 | 2e | do | 3 |
| 2c | do | 2 | 2f | do | 3 |
| 3a | Mercury salt | 2 | 3d | Mercury salt | 3 |
| 3b | do | 3 | 3e | do | 3 |
| 3c | do | 2 | 3f | do | 3 |
| 4a | Zinc salt | 2 | 4d | Zinc salt | 3 |
| 4b | do | 2 | 4e | do | 3 |
| 4c | do | 2 | 4f | do | 3 |

In each insance, it was observed that the gamma,gamma-p,p'-di(hydroxyphenyl)valeric acid or its salt effectively inhibited or retarded the development of the mold specimens.

I claim:

1. As a composition of matter, a heavy metal salt of gamma,gamma-p,p'-di(hydroxyphenyl)valeric acid.

2. As a compound a salt of gamma,gamma-p,p'-di(hydroxyphenyl)valeric acid and a heavy metal of a class consisting of mercury, copper, manganese, zinc, chromium and cobalt.

3. As a compound, a mercury salt of gamma,gamma-p,p'-di(hydroxyphenyl)valeric acid.

4. As a new compound, a copper salt of gamma,gamma-p,p'-di(hydroxyphenyl)valeric acid.

References Cited in the file of this patent

UNITED STATES PATENTS

| 1,933,520 | Bruson | Oct. 31, 1933 |
| 2,480,084 | Meyer | Aug. 23, 1949 |
| 2,692,204 | Nowak | Oct. 19, 1954 |
| 2,695,858 | Lisle | Nov. 30, 1954 |

FOREIGN PATENTS

| 23,010 | Great Britain | (of 1909) |

OTHER REFERENCES

Horsfall: Fungicides and Their Action, pages 108–9, Chronica Botanica Co., Waltham, Mass. (1945).

Prigge et al.: Arb. Paul Ehrlich Inst. und George, Speyer, Hans und Ferdinand Blum Inst., Frankfurt am Main, No. 49, page 85 (1951).

Bader et al.: J. Am. Chem. Soc., volume 75, pages 5416–17 (1953).

Bader et al.: J. Am. Chem. Soc., volume 76, pages 4465–6 (1954).